US011931319B2

(12) United States Patent
Claassen et al.

(10) Patent No.: US 11,931,319 B2
(45) Date of Patent: Mar. 19, 2024

(54) INDICATOR SYSTEM FOR A MILK CONTAINER AND A MILK STORAGE DEVICE USING THE SAME

(71) Applicant: KONINKLIJKE PHILIPS N.V., Eindhoven (NL)

(72) Inventors: Coen Petrus Martinus Claassen, Lommel (BE); Camiel Gubbels, Nederweert-Eind (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/780,176

(22) PCT Filed: Dec. 3, 2020

(86) PCT No.: PCT/EP2020/084410
§ 371 (c)(1),
(2) Date: May 26, 2022

(87) PCT Pub. No.: WO2021/115910
PCT Pub. Date: Jun. 17, 2021

(65) Prior Publication Data

US 2022/0409492 A1 Dec. 29, 2022

(30) Foreign Application Priority Data

Dec. 12, 2019 (EP) .................................... 19215730

(51) Int. Cl.
*A61J 9/00* (2006.01)

(52) U.S. Cl.
CPC ...................................... *A61J 9/00* (2013.01)

(58) Field of Classification Search
CPC ............. A61J 7/04; A61J 1/18; A61J 2200/70
See application file for complete search history.

(56) References Cited

U.S. PATENT DOCUMENTS 2,111,637 A * 3/1938 Mehaffey .................. A61J 7/04 215/230
3,139,064 A * 6/1964 Harle ..................... A61J 11/001 215/11.1

(Continued)

FOREIGN PATENT DOCUMENTS

WO 2009/111765 A2 9/2009

OTHER PUBLICATIONS

International Search Report and Written Opinion dated Feb. 8, 2021 For International Application No. PCT/EP2020/084410 filed Dec. 3, 2020.

*Primary Examiner* — Andrew T Kirsch

(57) ABSTRACT

An indicator system is provided for a milk container comprising a time display element with a time scale for indicating a freshness of milk. In one aspect, there are first and second indicator elements for indicating first and second selected portions of the time scale to signify when the milk container was filled and when the milk has reached a freshness threshold i.e. a particular storage time. In another aspect, there are first and second time scales on respective portions of the time display element, e.g. for fridge storage and for freezer storage, and an indicator element. A selected one of the first and second portions is in-use and the indicator element indicates a selected portion of the in-use first or second time scale.

20 Claims, 6 Drawing Sheets

(56) References Cited

U.S. PATENT DOCUMENTS

| | | | |
|---|---|---|---|
| 4,292,916 | A | 10/1981 | Bradley |
| 4,482,068 | A | 11/1984 | Agbay |
| 5,433,324 | A | 7/1995 | Leonard |
| 6,805,072 | B1 | 10/2004 | Desano |
| 9,134,288 | B1 | 9/2015 | Ettinger |
| 2008/0000791 | A1 | 1/2008 | Strong |
| 2012/0103849 | A1 | 5/2012 | Rachuk |
| 2013/0062346 | A1 | 3/2013 | Killinger |
| 2019/0234979 | A1 | 8/2019 | Wright |

* cited by examiner

INDICATOR SYSTEM FOR A MILK CONTAINER AND A MILK STORAGE DEVICE USING THE SAME

CROSS REFERENCE TO RELATED APPLICATIONS

This application is the U.S. National Phase application under 35 U.S.C. § 371 of International Application No. PCT/EP2020/084410 filed Dec. 3, 2020, which claims the benefit of European Patent Application Number 19215730.3 filed Dec. 12, 2019. These applications are hereby incorporated by reference herein.

FIELD OF THE INVENTION

This invention relates to milk storage devices, in particular milk bottles for babies for storing expressed or formula milk. The invention in particular relates to an indicator system for use with a milk container, which together form a milk storage device.

BACKGROUND OF THE INVENTION

Breast milk may be stored in a refrigerator for a limited period of time, such as for four days. Breast milk may also be frozen and stored in a freezer, such as for up to six months.

Containers of stored (human) breast milk are often desired to be identified by a day and even time of the day when the milk was expressed, which may indicate first, second, and third pumping sessions, or the first, second, and third feeding of the day, etc.

Some common labeling methods include a label which is hand-made from masking tape, a manufactured adhesive labeling material, or a piece of paper held to the side of the container with a rubber band.

Masking tape and adhesive labels create a problem in that they must be overwritten or removed for reuse of the container. Rubber bands break, or lose the attached note. Thus, there is a need for a more robust approach.

It is for example known to provide bottles with an electronic identification and then track the storage, and the associated expiration date, elsewhere. This is a complex system (e.g. by using software) and does not enable simple identification of which milk has expired based on a simple quick view of the bottle.

It has been proposed to include indices on the bottle or in the lid of the bottle. For example, U.S. Pat. No. 6,805,072 discloses a milk bottle with a rotatable ring to show when the milk was expressed.

The inclusion of an integrated timing indicator into the bottle in this way overcomes some of the problems associated with the earlier solutions, but the added complexity and cost to the bottle make it unattractive. It is also not applicable to existing bottles. Furthermore, different timing indications are needed for milk in the fridge and milk in the freezer. The user also has to calculate from the indicated time when the milk will have expired.

There is therefore still a need for an improved freshness indicator for stored milk.

SUMMARY OF THE INVENTION

The invention is defined by the claims.

According to examples in accordance with the invention, there is provided an indicator system for a milk container, comprising:

- a time display element for fitting to the milk container, comprising:
  - a first time scale for indicating a first freshness of milk on a first portion of the time display element for indicating a freshness of milk to be stored in first conditions; and
  - a second time scale for indicting a second freshness of milk on a second portion of the time display element for indicating a freshness of milk to be stored in second conditions; and
- an indicator element,
- wherein the time display element is adapted to be configured with only a selected one of the first and second portions being in-use and with the indicator element indicating a selected portion of the in-use first or second time scale.

The first and second conditions may relate to different storage temperatures (e.g. cooling and freezing). Alternatively, the different conditions may relate to different regulatory environments (e.g. allowing cool storage for a certain time or allowing frozen storage for a certain time) or different recommendations (e.g. recommended storage times may differ in different countries).

Each time scale comprises a sequence of time points with a rate which is suitable for the particular intended use of the indicator system, i.e. use in accordance with the first conditions or use in accordance with the second conditions). Only one of the time scales is used at any time, and the used time scale is the one having a portion indicated by the indicator element.

This time display element may be fitted to the milk container and hence may be in the form of a simple time indicator which is clipped to the milk container. It may be fitted to the milk container with a desired positional relationship such that the indicator element (e.g. of the milk container) indicates (e.g. points to) an appropriate selected portion of the in-use time scale. This selected portion may identify a month, week, day or time. By having two (or more) time scales, different time measurements may be used, as appropriate for the type of milk or the type of storage conditions.

By in-use is meant that the particular scale is most dominantly outwardly visible. The in-use time scale is the one with which the indicator is associated, and the design is such that it is immediately apparent to a user which time scale the indicator is referencing.

The indicator element is for example part of the milk container, for example formed by a lid of the milk container. It may be on a cap or other lid (e.g. a stopper) of the milk container. Thus the indicator system may be implemented by a milk container cap.

The time display element is for example for removable fitting to the milk container. Thus, a user may have a set of time display elements, which they can apply to any bottle they are currently using. They can choose not to use the time display element if they are not storing the milk.

The first and second portions of the time display element are for example on different sides or faces of the time display element. Thus, the orientation with which the time display element is fitted to the milk container determines which side or face is in-use.

The first time scale is for example for indicating a freshness of milk to be stored in a fridge and the second time scale is for indicating a freshness of milk to be stored in a freezer. Thus, a single time display element may be fitted to a milk container for the fridge or a milk container for the freezer, by selecting which scale is in-use.

The first time scale may for example be a day and/or time of day time scale (for short term storage in a fridge) and the second time scale may be a month and/or week time scale (for long term storage in a freezer).

The indicator element for example comprises:

a pointer; or an opening or openings in a cover, wherein the remainder of the cover hides the remainder of the in-use time scale.

The time display element may take various forms. Examples are:

a cylinder with an inner face and an outer face, wherein the cylinder can be inverted to swap the inner and outer faces;

an annular triangular cross section ring with two inner faces and an outer face, wherein the ring can be inverted to select which face is the outer face;

a flat slider with an upper face and a lower face; and a triangular cross section slider with an outer face and two inner faces.

For all of these examples, there are two or more portions, such as faces or sides, and one of these can be selected to be the one that is in-use.

In one particularly preferred example, the time display element comprises an annular disc, wherein the annular disc and the milk container are rotatable relative to each other. The disc for example has two sides, and one of those sides faces outwardly when the disc is fitted to the milk container.

Each time scale for example comprises a circular sequence of time points, where a total time period represented by each time scale is longer than a respective maximum storage time. Thus, when a first time point is indicated when the milk container was filled (i.e. when the milk was expressed), the time scale is long enough also to indicate a second time point at the maximum storage time.

The indicator system may comprise a ratchet mechanism for allowing adjustment of the position of the time display element in one direction only. In this way, the chance of the time display element indicating that the milk is more fresh than it actually is can be significantly reduced.

The invention also provides a milk storage device comprising:

a milk container; and an indicator system as defined above.

Optionally, the milk container in the above milk storage device comprises said indicator element for indicating a portion of the in-use first or second time scale.

Thus, the time display element is mounted to the milk container such that the indicator element indicates a time signifying when the milk container was filled, i.e. when the milk was prepared. The indicator element of the milk container may for example be part of a cap of the milk container or a stopper of the milk container.

The milk container may then comprise a second indicator element for indicating a second selected portion of the in-use first or second time scale to signify when the milk has reached a freshness threshold. This may be a maximum allowable storage time or a time when the milk has retained a certain e.g. maximum freshness (even if it can be consumed for some time later).

Thus, by selecting the position of the time display element and the milk container relative to each other to record the time the milk container was filled, there is automatically an indication of the expiry time.

An angular or linear displacement between the first and second indicator elements preferably corresponds to a recommended maximum or maximum optimal storage time in a fridge when interpreted using the first time scale and corresponds to a recommended maximum or maximum optimal storage time in a freezer when interpreted using the second time scale.

A maximum storage time is a time after which the milk should not be consumed. A maximum optimal storage time is a time after which the milk is no longer optimally fresh but may still be consumed for a further time.

Thus, the same type of milk container may be used for fridge storage or freezer storage, and the single design of time display element enables the filling time and expiry time to be immediately discernable, by selecting which portion of the time display element to use.

The milk container may comprise:

a bottle body having a filling opening;

a stopper for sealing the filling opening; and a cap for fitting over the filling opening and clamping the stopper in place, the cap having a central opening, wherein the stopper projects through the central opening, wherein the time display element is for fitting over the part of the stopper that projects through the central opening.

This is a type of bottle which may be used for storage and for feeding, by replacing the stopper with a teat. The time display element simply fits over the stopper, for example the user may select a suitable angular orientation to match the time when the milk was prepared.

A set of one or more teats may then be provided for use with the cap.

In another set of examples, the milk container may comprise:

a bottle body having a filling opening;

a cap for fitting over the filling opening; and a stopper for fitting into the cap, wherein the time display element is for fitting over the stopper.

In this case, the stopper fits over the cap. It may be the same design of stopper as in the feeding bottle, but is used in this configuration only as an indicator. The time display element may for example functions as a fitting which couples the stopper to the cap and also provides the timing information discussed above.

The position of the time display element may be selected relative to the stopper with the stopper fixed in position (i.e. the time display element is fitted to the stopper after the milk bottle is fully assembled). Alternatively, the time display element may be positionally fixed to the cap and the position of the stopper is selected.

The stopper may have the indicator element or indicator elements discussed above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
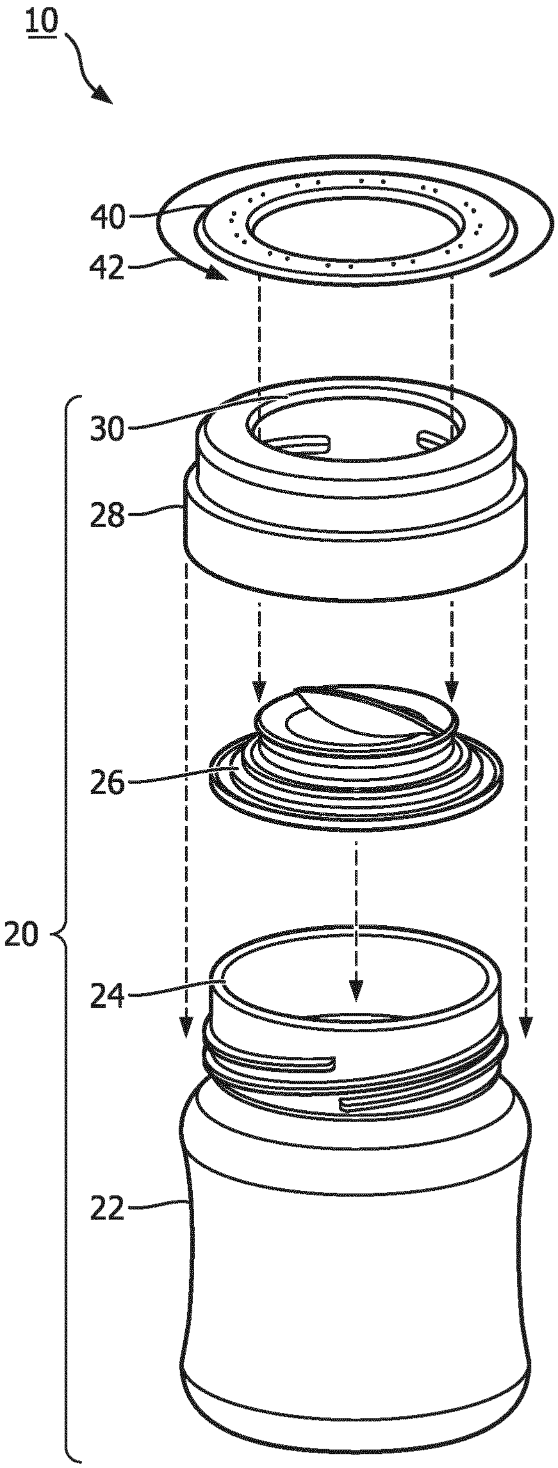
FIG. 1 shows a first example of a milk storage device in exploded view.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an indicator system for a milk container comprising a time display element with a time scale for indicating a freshness of milk. In one aspect, there are first and second indicator elements for indicating first and second selected portions of the time scale to signify when the milk container was filled and when the milk has reached a freshness threshold i.e. has been stored for a particular time. In another aspect, there are first and second time scales on respective portions of the time display element, e.g. for fridge storage and for freezer storage, and an indicator element. A selected one of the first and second portions is in-use and the indicator element indicates a selected portion of the in-use first or second time scale.

FIG. 1 shows a first example of a milk storage device 10 in exploded view. The milk storage device 10 comprises a milk container, which in this example is milk bottle 20 for an infant or baby, and a time display element 40 for removable fitting to the milk bottle 20. Thus, the terms “milk container” and “milk bottle” are used to denote all parts which together make up a conventional milk container or bottle, in particular a baby feeding bottle or a bottle for storing milk for a baby. The term “milk storage device” is used to denote the combination of a milk container or milk bottle with a time display element. The time display element for example functions to enable an indication of a time to be made, such as a filling time when the milk container was filled (typically the same time that the milk was expressed or made) and another time such as an expiration time or the end of a maximum freshness time.

The milk bottle 20 comprises a bottle body 22 having a filling opening 24 (i.e. a top opening).

A stopper 26 is used for sealing the top opening 24. A cap 28 is provided for fitting over the top opening 24 and clamping the stopper 26 in place against the top opening 24. The cap has a central opening 30, wherein the stopper projects through the central opening.

The reason for the opening 30 in the cap 28 is that the bottle may be used either for storage (with the stopper 26) or for feeding. During feeding, a teat is placed through the opening 30 and the stopper is not used. The teat is clamped against the top opening 24 by the cap 28. The teat has an air refill valve so that the air is replaced when a baby drinks from the milk bottle.

The invention is based on the addition of a time display element 40.

The time display element 40 is for removable fitting to the milk bottle 20.

In the examples described below, the time display element has at least one time scale which has a time line. By using an indicator element to indicate a selected portion of the time scale, i.e. a particular point in time along the time line, the time when the milk was prepared (i.e. when the milk container was filled) can be indicated to a user in a simple visual manner. In some equivalent examples, the time line may be on the bottle body or the cap, and the time display element then implements the indicator element.

The indicator element in the example shown is part of the milk bottle. It may be one or more markings on the cap 28 or it may be one or more markings on the stopper 26.

The time display element 40 is fitted to the milk bottle when it is placed in storage, in a fridge or freezer, and is in the form of a simple time indicator which is clipped to the milk bottle. It is attached with a user-selected positional relationship such that an indicator element (of the milk bottle) identifies an appropriate selected portion of the time scale. This selected portion may identify a month, week, day or time.

There are various possible designs for the time display element. One preferred example will be described in detail before other options are outlined.

As shown in FIG. 1, the time display element 40, in this preferred example, comprises an annular disc. The annular disc and the milk bottle are rotatable relative to each other as shown by arrow 42. In the example shown, the disc 40 clips over the top of the stopper 26 which projects through the opening 30.

The time scale comprises a circular sequence of time points, so that a continuous time sequence is defined with no jumps. A total time period represented by the time scale is longer than a respective maximum storage time.

For example, if the time scale is for milk to be stored in a fridge, the desired maximum time period may be 4 days. The time scale for example represents a duration of 1 week.

If the time scale is for milk to be stored in a freezer, the desired maximum time period may be 6 months. The time scale for example represents a duration of 1 year.

At any point in time, there is a suitable time point on the scale to represent that time point. For example the time scale may be all hours of the day, all days of the week, all days or weeks of a month, or all months of a year.

Thus, when a first time point is indicated when the milk container was filled, the time scale is long enough also to indicate a second time point at the maximum storage time.

Figure 2:
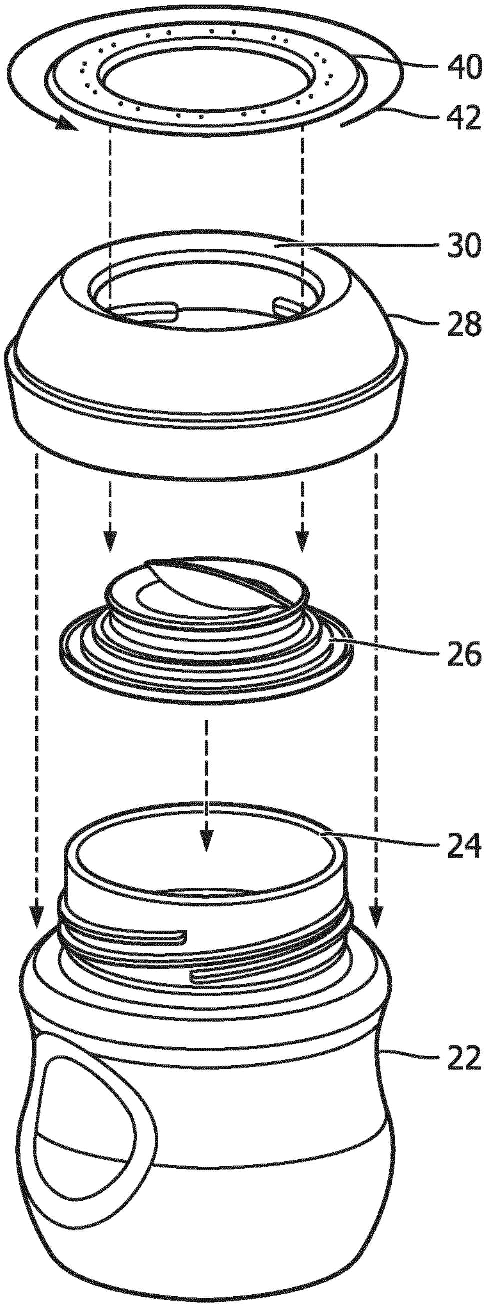
FIG. 2 shows a slightly different design of milk storage device, but with the same components.

FIG. 2 shows a slightly different milk bottle design, but with the same components. The same reference numbers are used as in FIG. 1. Despite the different shapes, the same time display element 40 may be used, as long as it can clip to the stopper 26 (which may be the same or different to the stopper of FIG. 1).

Figure 3:
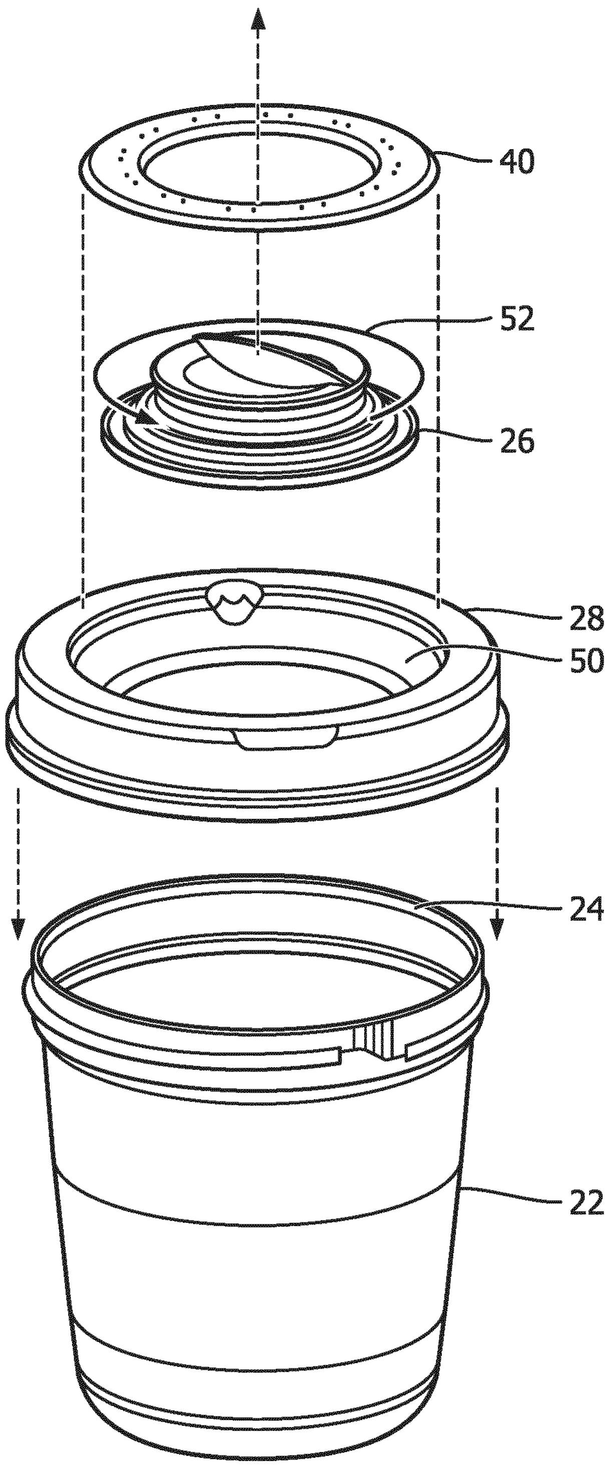
FIG. 3 shows an other example of a milk storage device.

FIG. 3 shows an other example of a milk bottle. This design again has a bottle body 22 having a top opening 24. However, the cap 28 is a more conventional lid, with no opening. Thus, no stopper is needed.

However, the cap 28 has a recess 50 for receiving a stopper 26 (even though it is not needed for this use of the bottle). Thus, the different bottles shown are part of a modular set. In this example, the stopper fits into the cap. The time display element 40 is again for fitting over the stopper 26 and it holds the stopper in place within the recess. In particular, the time display element 40 couples at its outer rim with an inner surface of the cap 28 and the time display element couples at its inner rim with an outer surface of the stopper 26. Thus, the time display element couples the stopper to the cap.

FIGS. 1 and 2 show the time display element 40 rotatable relative to the stopper 26 and the rest of the bottle to provide the time setting. It may slide around the stopper, but with some friction to maintain a selected position.

FIG. 3 instead shows the time display element 40 fixed to the cap 28 and the stopper is rotatable relative to the cap and the time display element (and relative to the rest of the bottle) as shown by arrow 52. Thus, the frictional engagement between the outer rim of the time display element and the cap is stronger than the frictional engagement between the inner rim of the time display element and the stopper. Alternatively, the stopper may be fixed more strongly to the time display element, and the time display element and stopper then rotate as a unit relative to the cap.

Figure 4:
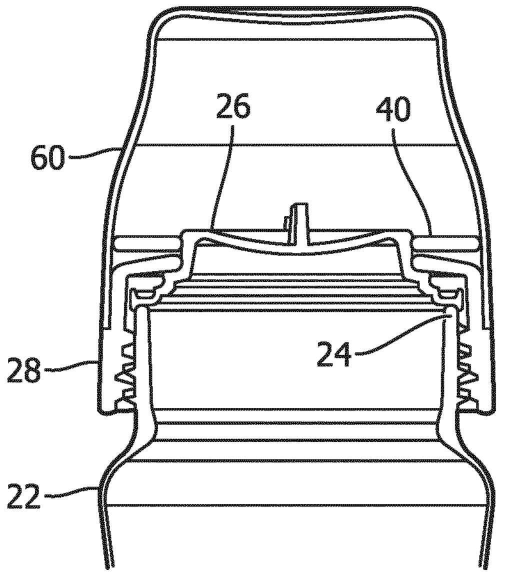
FIG. 4 shows a cross section through the top part of FIG. 1.

FIG. 4 shows a cross section through the top part of FIG. 1 and additionally shows a protective cover 60.

Figure 5:
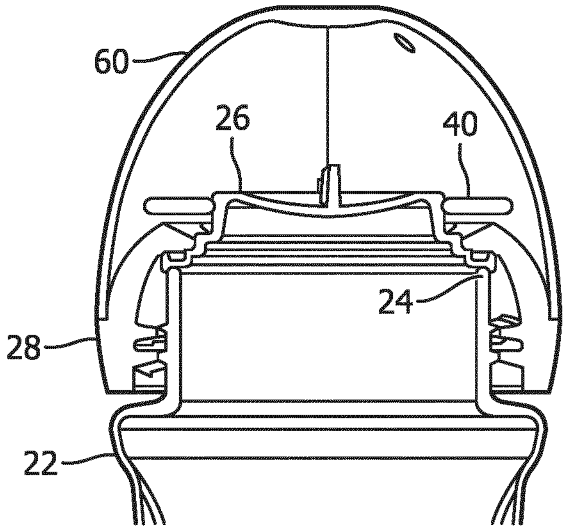
FIG. 5 shows a cross section through the top part of FIG. 2.

FIG. 5 shows a cross section through the top part of FIG. 2 and additionally shows a protective cover 60.

It can be seen that the cap 28 engages with a different part of the stopper 26 in these two designs. The stopper is designed to be suitable for use with different bottle designs.

Figure 6:
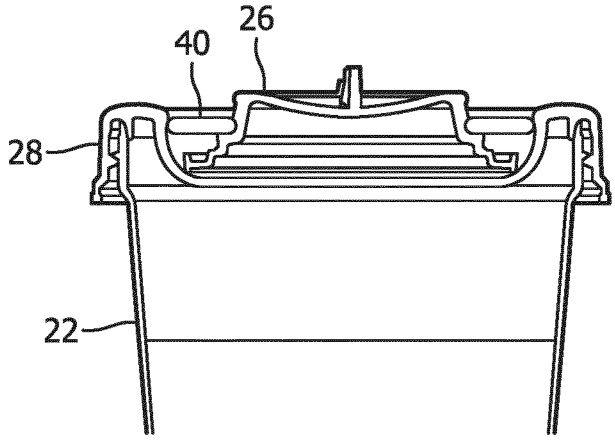
FIG. 6 shows a cross section through the top part of FIG. 3.

FIG. 6 shows a cross section through the top part of FIG. 3.

It can be seen that the time display element 40 engages with a different part of the stopper 26 compared to the designs of FIGS. 4 and 5.

Figure 7:
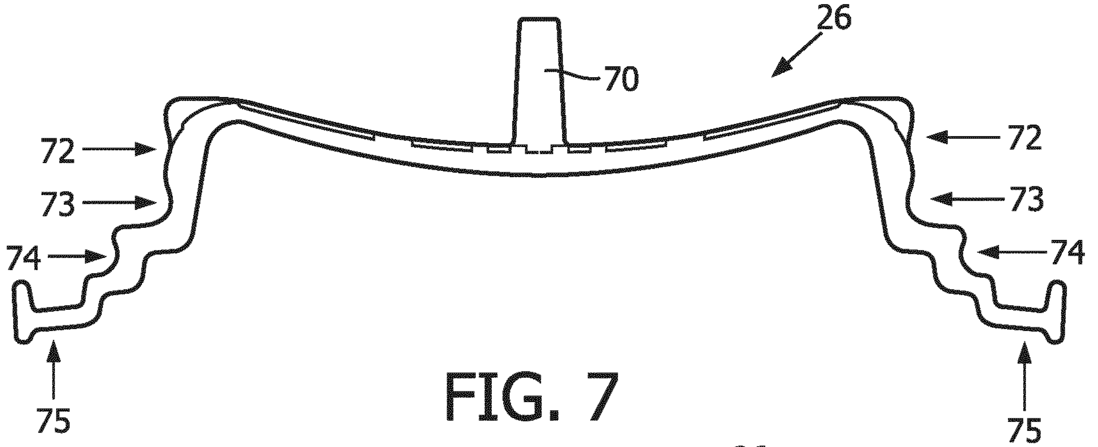
FIG. 7 shows the stopper in cross section.

FIG. 7 shows the stopper in cross section. It has a handle 70 for enabling rotational adjustment of the position of the stopper as shown by arrow 52 in FIG. 3 (which may of course also apply to the bottles of FIGS. 1 and 2). The handle also functions as the indicator element. For example an end of the handle may function as a pointer, which points to a particular location of the time scale.

The stopper has a set of interfaces 72,73,74,75 to enable use with different cap designs (for example as explained above with reference to FIGS. 4 to 6).

Figure 8:
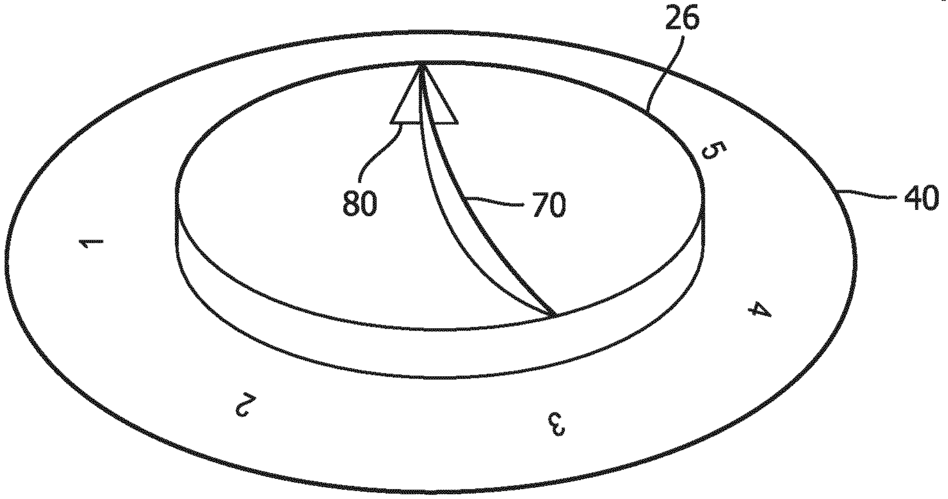
FIG. 8 shows the stopper projecting through the middle of the time display element.

FIG. 8 shows the stopper 26 projecting through the middle opening of the time display element 40, and it shows how one end of the handle 70 functions as a pointer 80.

Only one time scale has been described in detail above. However, the disc described has two sides, and in accordance with one aspect, there is a first time scale on one side and a second time scale on the other side. One side faces outwardly (upwardly in this example) when the disc is fitted to the milk bottle. By having two (or indeed more) time scales, different time measurements may be used, as appropriate for the type of milk or the type of storage conditions.

Thus, in an example, a first time scale is for indicating a first freshness of milk on a first side of the time display element 40 and a second time scale for indicting a second freshness of milk on a second side of the time display element 40.

More generally, there may be first and second portions of the time display element with first and second time scales. These portions may be different sides or they may be different regions of a single side. By arranging one region to be hidden from view, only one of the time scales is in-use.

The first time scale may be for indicating a freshness of milk to be stored in a fridge and the second time scale may be for indicating a freshness of milk to be stored in a freezer. Thus, a single time display element may be fitted to a bottle for the fridge or a bottle for the freezer, by selecting which scale is outwardly visible, and hence in-use.

Figure 9:
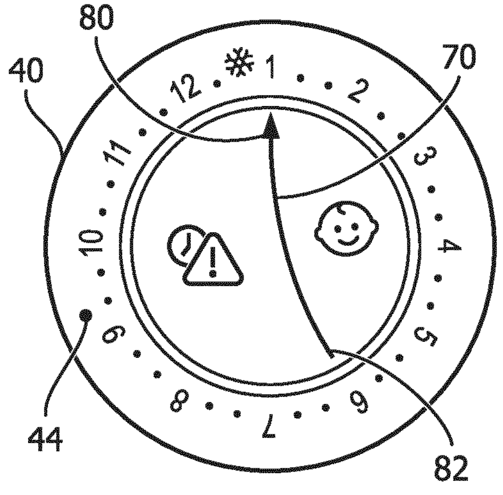
FIG. 9 shows a possible design for one side of a time display element.
Figure 10:
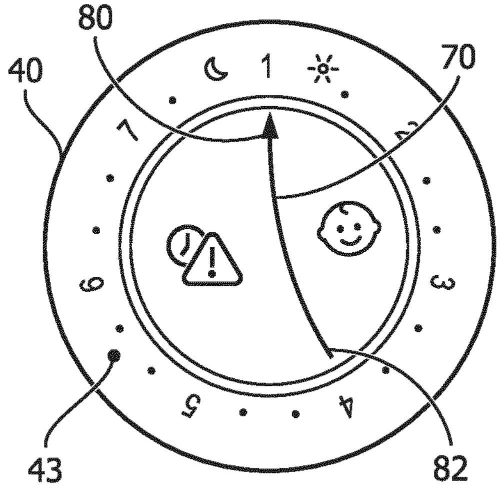
FIG. 10 shows a possible design for the other side of the same time display element as FIG. 9.

FIG. 9 shows a possible design for one side of a time display element 40 and FIG. 10 shows a possible design for the other side of the same time display element 40. The time display element is shown around the stopper.

FIG. 9 shows a time scale 44 which is a count from 1 to 12 representing the months of the year. The pointer 80 of the handle 70 points to "1" indicating that this milk was prepared and frozen in January. The other end of the handle defines a second pointer 82, discussed further below.

FIG. 10 shows a time scale 43 which is a count from 1 to 7 representing the days of the week. The pointer 80 of the handle 70 points to "1" indicating that this milk was prepared and placed in the fridge on Monday. Of course words may be used instead of numbers. Finer divisions of time are also possible. For example a day number may represent midday, a dot before may represent early morning and a dot after may represent afternoon or evening.

The detailed description above explains how a pointer (or more generally any indicator element) may be used to indicate when the milk container was filled for storage.

There may be a second indicator element for indicating a second selected portion of the time scale (or the time scale that is in-use if there is more than one) to signify when the milk has been stored for a maximum time. Thus, by selecting the relative position of the time display element to record the time the milk container was filled, there is automatically an indication of the expiry time.

The opposite end of the handle 70 may function as the second indicator element 82.

Thus, in FIG. 9, the expiry of the milk is indicated as "6" i.e. June. In FIG. 10, the expiry of the milk is indicated as "4" i.e. Thursday.

In this way, an angular displacement (when a rotary time display element is used) between the first and second indicator elements 80, 82 corresponds to a recommended maximum storage time. When the time display element has two or more scales, that displacement amount is the maximum storage time when interpreted using either scale. Thus, the displacement corresponds to a recommended maximum storage time in a fridge when interpreted using one time scale and corresponds to a recommended maximum storage time in a freezer when interpreted using the other time scale.

Thus, the same type of milk bottle may be used for fridge storage or freezer storage, and the single design of time display element 40 enables the filling time and expiry time to be immediately discernable, by selecting which side of the time display element to use.

The first and second indicator elements are fixed relative to each other in this example, since the stopper is simply a solid item. Thus, they have a certain spacing, which when aligned with the time scale corresponds to a particular duration, which is the maximum storage duration.

The first and second indicator elements may instead have adjustable positions relative to each other. This for example may allow a user to set their preferences (i.e. how long they are prepare to store the milk) or the adjustment may be based on their fridge temperature, or freezer temperature.

The examples above show a simple pointer to a time point along the time scale. The second indicator element (for the maximum storage time) may instead point to a range of times of the time scale. In this way it may indicate different freshness levels for different times within the range of times. There may for example be color coding of different levels of freshness (green for good, amber for medium, red for bad), so that by looking at the current time (day, date, week, or month for example) an intuitive indication of freshness may then be easily obtained (using a traffic light notation in this example).

It is also possible to use different indicator elements for different ranges of times. For example, the duration of freshness may differ significantly for refrigeration (e.g. 2 days) and freezing (e.g. 6 months). Different indicator elements may be used for indicating a time period representing a freshness duration.

The examples above are based on different time scales for fridge or freezer storage. There may be separate time scales (or even separate time display devices altogether) for different milk types (e.g. fresh or formula, although typically formula milk is not stored).

Figure 11:
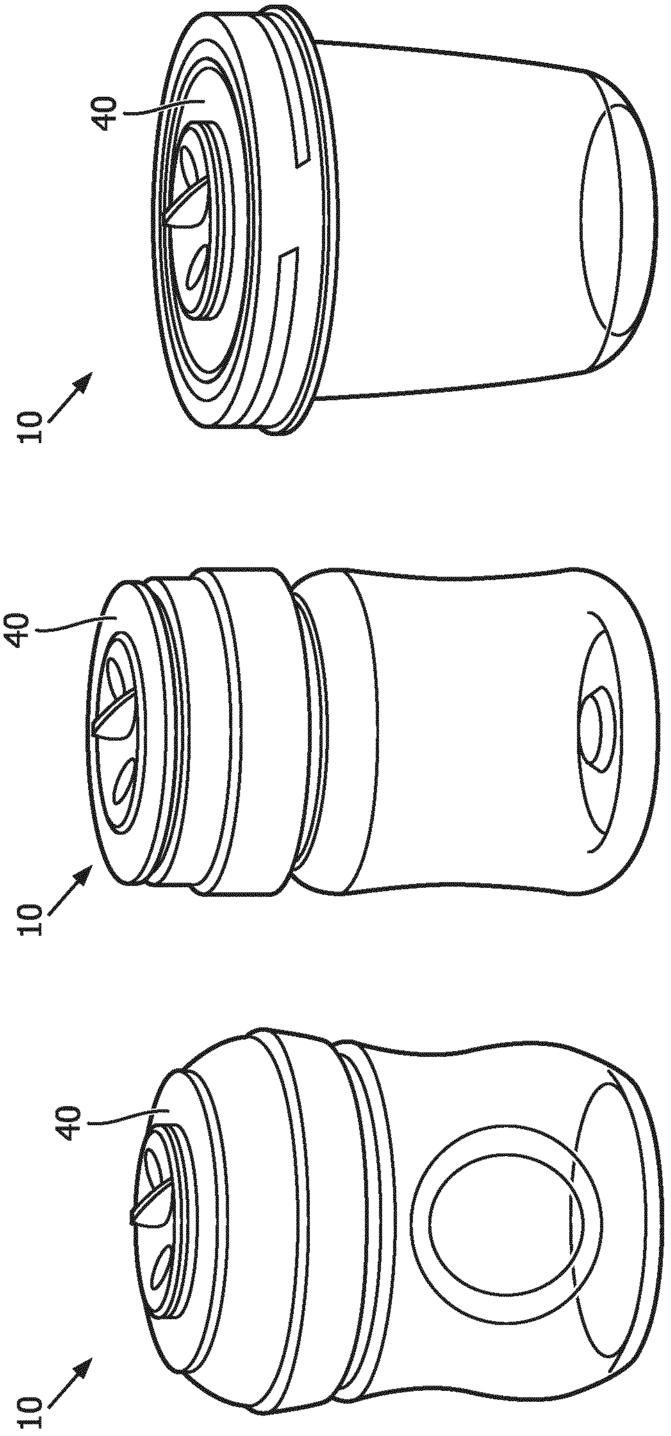
FIG. 11 shows images of the three bottle types of FIGS. 1 to 3 in assembled states.

FIG. 11 shows images of the three bottle types of FIGS. 1 to 3 in assembled states.

The stopper may be the same in all three bottle types. Thus, there may be a modular set of bottles each with a bottle body 22 having a filling opening 24 and a stopper. In one bottle type, the stopper is for sealing the filling opening and a cap 28 is provided for fitting over the filling opening and clamping the stopper in place, the cap having a central opening. The stopper then projects through the central opening. In another bottle type, a cap 28 is provided for fitting over the filling opening and the stopper 26 is for fitting into the cap. In both bottle types, the time display element 40 is for fitting over the stopper.

The examples above are based on a time scale which forms a ring of time points around an annular disc. There are other examples.

Figure 12:
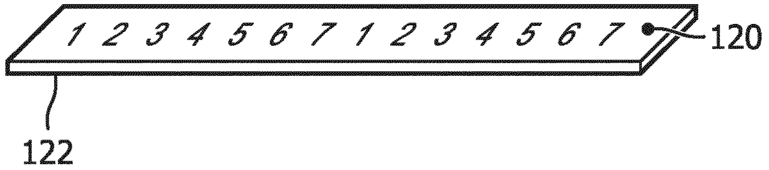
FIG. 12 shows a linear slider.

FIG. 12 shows a linear slider. It may be positioned within, and slideable along, a slot in the bottle lid (for example in the stopper or cap). There may then be a first time scale on one side 120 and a second time scale on an opposite side 122. This linear slider may for example wrap around the lid or around the bottle neck.

Figure 13:
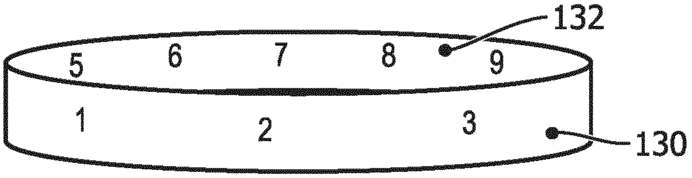
FIG. 13 shows a cylinder with an inner face and an outer face.

FIG. 13 shows a cylinder with an inner face 130 and an outer face 132, each carrying a time scale. The cylinder is flexible so that it can be inverted to swap the inner and outer faces. It may be mounted around the stopper or in a receiving port of the cap or around the bottle itself.

Figure 14:
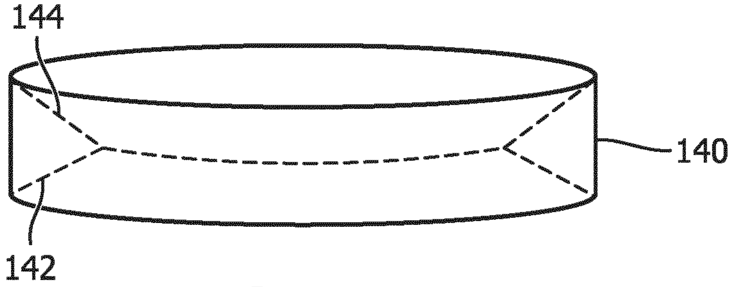
FIG. 14 shows an ring with a triangular cross section.

FIG. 14 shows a ring with a triangular cross section. It has an outer face 140 and two inner faces 142,144. The ring can be inverted to select which face is the outer face 140. In this way, there may be three time scales. It may fit into a triangular channel around the stopper or cap.

Figure 15:
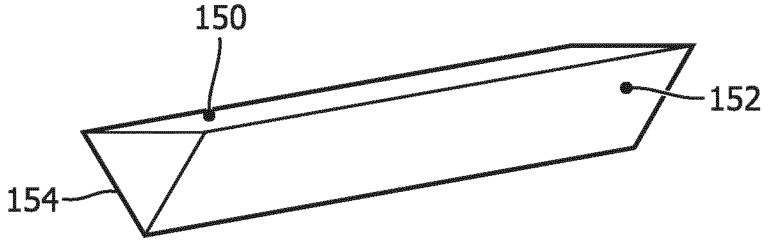
FIG. 15 shows a triangular cross section slider with an upper face and two lower faces.

FIG. 15 shows a triangular cross section slider with an upper face 150 and two lower faces 152,154. It may be fitted into a triangular channel with a selected one of the faces being in-use, by facing outwardly.

For all of these examples, there are two or more faces or sides, and one of these can be selected to be the one that is in-use, for example outwardly visible (or most dominantly outwardly visible).

Figure 16:
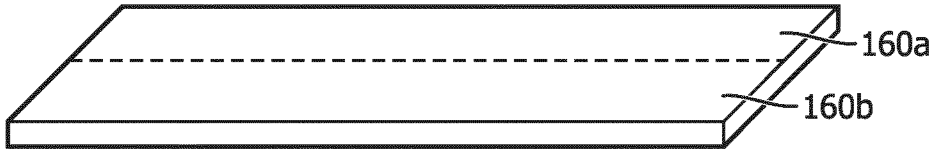
FIG. 16 shows a linear slider with two regions on one face.

FIG. 16 shows an example in which two time scales 160*a*, 160*b* are provided on the same side. When fitted to the milk container, only one time scale is in-use, for example depending on which way up the time display element is mounted. The other time scale may for example be covered up by a feature of the milk container. If both sides are used, there are then four possible time scales.

In the examples above, the in-use time scale is fully visible and the indicator element points to a part of the time scale. In another example, the indicator element may cover up the time scale, and have an opening which reveals the selected part of parts of the time scale (e.g. a filling time opening and an expiry opening). The opening or openings then function as the indicator element or elements.

In some examples above, different time scales are used which relate to different measures of freshness. Different sides or faces may use the same time scale (i.e. relate to the same time period) but may identify milk from the left breast or the right breast, or identify milk from one woman or another. The different times scales may be identifiable by different markings or colors.

The time display element may be designed to be suitable for existing systems for the storage of baby milk. These systems often comprise a number of different cups. Some of these cups may be specifically shaped for storage and may have a simple lid (e.g. FIG. 3) whereas others, such as baby bottles (e.g. FIGS. 1 and 2) may have a screw ring and a separate stopper that is inserted instead of the drinking nipple. Furthermore, storage containers and bottles may have varying diameters. Milk bags may also be used for the storage of milk.

The approaches of the invention may be applied to different storage solutions. For example, the annular design may be mounted onto a cylinder using the inner rim (hole) or it may be mounted within a cylindrical recess using the outer rim.

The main example above has the time scale or scales on the rotatable disc. When there is only one time scale, the disc may instead have the indicator element or elements, and the time scale may then form part of the cap or stopper (i.e. part of the milk bottle). Thus, a first indicator element is aligned with a time scale on the bottle to indicate the current time (day or month, for example), and the second indicator element points to the end time for which the milk will remain fresh.

A ratchet mechanism between the turning part and its counter part may be used to fix a given position. If the ratchet mechanism enables turning preferentially in one direction, this can be used to prevent accidental turning of the indicator such as to risk an indication of freshness being incorrect (so it turns to an earlier filling time). The individual indents of the ratchet for example correspond to a preferred time period on each scale, e.g. an indent for each hour, or day or week/fortnight.

The time display element may have rough or otherwise structured surfaces or rims to inhibit relative movement with parts with which it should be fixed. It may have grooves or grips on the surface.

The time scale or scales may be made to be easily recognizable via machine reading devices, so the information can be read, for example via a camera, and stored, analyzed or otherwise used in a computerized system.

Additional information may be encoded with different scales. For example, the movable part could indicate the breast side used (left or right, by having a different shape, color, or symbol).

The main bottle body may be plastic or glass.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. An indicator system for a milk container, comprising:

a time display element configured to fit to the milk container, the time display element comprising:

a first time scale indicating a first freshness of milk on a first portion of the time display element when the milk is stored in first conditions, and a second time scale indicating a second freshness of milk on a second portion of the time display element when the milk is stored in second conditions, the first conditions being different from the second conditions, wherein the time display element is configured such that only one of the first portion or the second portion that is selected to be in-use is outwardly visible;

a first indicator element configured to indicate a selected beginning portion of the first time scale or the second time scale of the in-use one of the first portion or the second portion; and a second indicator element configured to indicate a selected end portion relative to the selected beginning portion of the first time scale or the second time scale of the in-use one of the first portion or the second portion.

2. The indicator system as claimed in claim 1, wherein the each of the first and second indicator elements is part of the milk container.

3. The indicator system as claimed in claim 2, wherein the first and second indicator elements are formed by a lid of the milk container.

4. The indicator system as claimed in claim 1, wherein the time display element is for removable fitting to the milk container.

5. The indicator system as claimed in claim 1, wherein the first and second portions of the time display element are on different sides or faces of the time display element.

6. The indicator system as claimed in claim 1, wherein the first time scale is for indicating a freshness of milk stored in a fridge and the second time scale is for indicating a freshness of milk stored in a freezer.

7. The indicator system as claimed in claim 1, wherein each of the first and second indicator elements comprises a pointer.

8. The indicator system as claimed in claim 1, wherein the time display element comprises:

a cylinder with an inner face and an outer face, wherein the cylinder can be inverted to swap the inner and outer faces;

an annular triangular cross section ring comprising three faces, wherein two of the three faces are inner faces and one of the three faces is an outer face, wherein the annular triangular cross section ring can be inverted to select which of the three faces is the outer face;

a flat slider with an upper face and a lower face; or a triangular cross section slider with an outer face and two inner faces.

9. The indicator system as claimed in claim 1, wherein the time display element comprises an annular disc, wherein the annular disc and the milk container are rotatable relative to each other.

10. The indicator system as claimed in claim 9, wherein the time display element comprises the annular disc, and wherein each of the first time scale and the second time scale comprises a circular sequence of time points, where a total time period represented by each of the first time scale and the second time scale is longer than a respective maximum storage time.

11. The indicator system as claimed in claim 1, wherein the second indicator element is in a fixed positional relationship relative to the first indicator element.

12. A milk storage device comprising a milk container; and an indicator system attachable to the milk container, wherein the indicator system comprises:

a time display element comprising:

a first time scale indicating a first freshness of milk on a first portion of the time display element when the milk is stored in first conditions, and a second time scale indicating a second freshness of milk on a second portion of the time display element when the milk is stored in second conditions, the first conditions being different from the second conditions, wherein the time display element is configured such that only one of the first portion or the second portion that is selected to be in-use is outwardly visible;

a first indicator element configured to indicate a selected beginning portion of the first time scale or the second time scale of the in-use one of the first portion or the second portion; and a second indicator element configured to indicate a selected end portion relative to the selected beginning portion of the first time scale or the second time scale of the in-use one of the first portion or the second portion.

13. The milk storage device as claimed in claim 12, wherein the selected beginning portion indicated by the first indicator element of the in-use first or second time scale signifies when the milk container is filled with the milk and the selected end portion indicated by the second indicator element of the in-use first or second time scale signifies when the milk has reached a freshness threshold.

14. The milk storage device as claimed in claim 13, wherein an angular or linear displacement between the first and second indicator elements corresponds to a recommended maximum or maximum optimal storage time in a fridge when interpreted using the first time scale and corresponds to a recommended maximum or maximum optimal storage time in a freezer when interpreted using the second time scale.

15. The milk storage device as claimed in claim 14, wherein the milk container comprises a stopper having the first and second indicator elements.

16. The milk storage device as claimed in claim 12, wherein the milk container comprises:

a bottle body having a filling opening;

a stopper for sealing the filling opening, and a cap configured to fit over the filling opening and clamping the stopper in place, the cap having a central opening, wherein a part of the stopper projects through the central opening, wherein the time display element is configured to fit over the part of the stopper that projects through the central opening.

17. The milk storage device as claimed in claim 16, further comprising:

a set of one or more teats for use with the cap.

18. The milk storage device as claimed in claim 12, wherein the milk container comprises:

a bottle body having a filling opening;

a cap configured to fit over the filling opening, and a stopper configured to fit into the cap, wherein the time display element is configured to fit over the stopper.

19. An indicator system for a milk container, comprising:

a time display element configured to fitting to the milk container, the time display element comprising:

a first time scale indicating a first freshness of milk on a first portion of the time display element when the milk is stored in first conditions, and a second time scale indicating a second freshness of milk on a second portion of the time display element when the milk is stored in second conditions, the first conditions being different from the second conditions, wherein the time display element is configured such that only one of the first portion or the second portion that is selected to be in-use is outwardly visible; and a moveable handle comprising a first pointer on one end configured to point to a first time on the first time scale or the second time scale of the selected in-use one of the first portion or the second portion, and a second pointer on an opposite end movable together with the first pointer and configured to point to a second time on the first time scale or the second time scale of the selected in-use one of the first portion or the second portion.

20. The indicator system as claimed in claim 19, wherein the first time is a filling time of filling the milk container with milk and the second time is an expiration time of the milk based on the filling time.

* * * * *